UNITED STATES PATENT OFFICE.

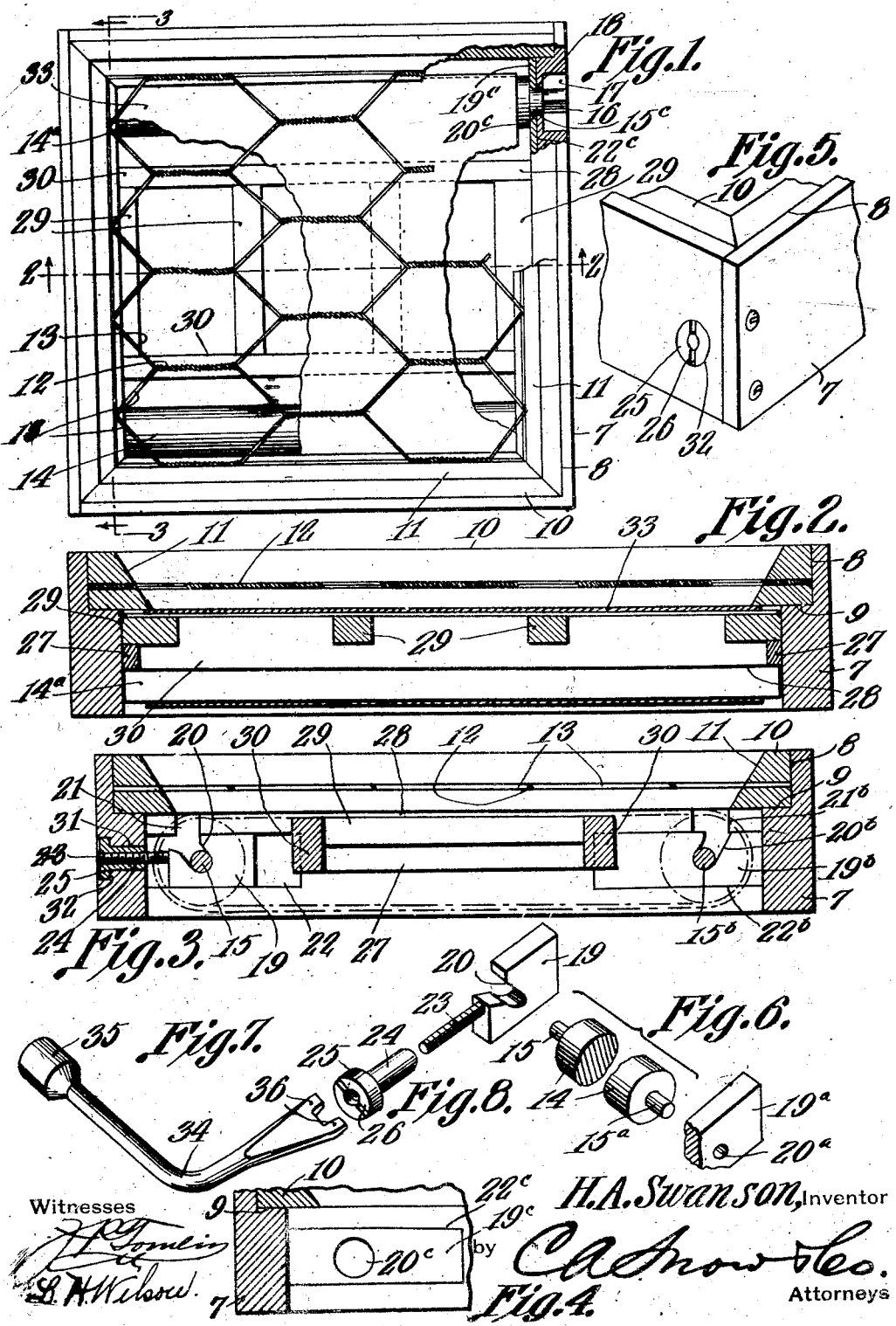

HJALMAR A. SWANSON, OF CLAY CENTER, NEBRASKA.

EGG-TRAY.

1,063,080.  Specification of Letters Patent.  Patented May 27, 1913.

Application filed April 30, 1912. Serial No. 694,168.

*To all whom it may concern:*

Be it known that I, HJALMAR A. SWANSON, a citizen of the United States, residing at Clay Center, in the county of Clay and State of Nebraska, have invented a new and useful Egg-Tray, of which the following is a specification.

This invention relates to egg trays for use in connection with incubators, and among its several objects contemplates a device of this character adapted to hold a plurality of eggs and having means for rolling the eggs whenever desired or essential.

Another object of the present invention is to provide a device of this character embodying a pair of rollers and a belt or endless apron trained over the rollers, and having means for adjusting one of the rollers to tighten and loosen the belt, and the other rollers being adapted to be rotated in order to shift the belt or apron which forms a support for the eggs.

This invention also aims to produce such a device which shall be comparatively simple and inexpensive in its construction as well as convenient and efficient in use.

A further object of the present invention is to provide a device of the character indicated embodying an egg support adapted to be shifted and embodying an egg-holder having elongated egg-receiving openings of practically the same dimensions as the eggs in order to prevent the eggs from rotating about vertical axes and which egg-holder is seatable over the egg support so that the eggs are lifted slightly out of the openings and may be rolled by shifting the egg support laterally of the openings.

A still further object of the present invention is to provide a device of this character indicated wherein the rollers and belt may be readily removed when the belt is tightened and wherein the rollers and belt are locked against removal when the belt is tightened.

With the foregoing and other objects in view, this invention is embodied in the novel construction and combination of parts hereinafter set forth and particularly pointed out in the appended claims, it being understood that this device is susceptible of alterations or deviations in its details within the scope of the appended claims without departing from the spirit of the invention.

The invention is illustrated in its preferred embodiment in the accompanying drawings, wherein similar reference characters have been employed to denote corresponding parts and wherein:—

Figure 1 is a plan view of the present egg tray, parts being broken away. Figs. 2 and 3 are enlarged sectional views taken on the lines 2—2 and 3—3 of Fig. 1, respectively. Fig. 4 is a fragmental detail in elevation of the interior of the main frame. Fig. 5 is a fragmental perspective of a detail. Fig. 6 is a fragmental perspective of one of the rollers and its bearings, the various parts being separated. Fig. 7 is a perspective view of an implement employed in connection with the egg tray for adjusting one of the rollers and for rotating the other roller. Fig. 8 is a perspective view of one of the adjusting nuts employed in connection with the device.

Referring specifically to the drawings, the main frame, which is rectangular in contour, has been designated by the numeral 7, and this frame is provided with an upper rabbet 8 forming a seat 9 within the upper edge of the frame. This frame has the inner recesses 22 and $22^b$ in one side thereof below the rabbet 8 and has the inner recesses $22^a$ and $22^c$ in the opposite side thereof, the respective pairs of recesses 22—$22^a$ and $22^b$—$22^c$ being arranged at the opposite end portions of the two sides. Ways or channels 21 and $21^b$ extend upwardly from the recesses 22 and $22^b$ to the seat 9, and the frame 7 is provided with a bore or opening 18 extending outwardly from the recess $22^c$, the outer end of the bore 18 being counter-bored in order to provide a socket or recess 17 in the outer face of the corresponding side. The frame 7 is also provided with bores 31 passing through the other side thereof adjacent the recesses 22 and $22^a$, which bores have their outer ends counter-bored or enlarged to provide the sockets or seats 32.

The egg-holder comprises a rectangular frame 10 having the inner side 11 thereof beveled and having a wire filling 12 of polygonal mesh providing a plurality of egg-receiving openings 13. This filling 12 is disposed above the bottom of the frame 10 and the openings 13 are elongated and of such a size to permit the eggs to pass therethrough, the said openings having the dimensions thereof practically the same as the dimensions of the eggs. The frame 10 is adapted to rest on the seat 9 within the main frame 7, so that the upper side of the frame 10 is flush with the upper edge of the frame 7, the inner side of the frame 10 projecting beyond the inner side of the frame 7. The openings 13 being elongated and as large as the eggs, are adapted to receive the eggs in such a manner that the eggs will be prevented from rotating about vertical axes.

The respective bearings 19, 19$^a$, 19$^b$ and 19$^c$ are arranged in the recesses 22, 22$^a$, 22$^b$ and 22$^c$, so that the said bearings are mounted in the frame 7 and within the inner faces thereof. The bearings 19 and 19$^b$ are provided with open slots 20 and 20$^b$, respectively, which register with the ways 21 and 21$^b$. The other bearings 19$^a$ and 19$^c$ are provided with the respective openings 20$^a$ and 20$^c$. The bearings 19 and 19$^a$ are slidable longitudinally in the recesses 22 and 22$^a$, while the bearings 19$^b$ and 19$^c$ are snugly arranged within the recesses 22$^b$ and 22$^c$ and are immovable.

The rollers 14 and 14$^a$ are arranged within the frame 7 and have the respective pairs of trunnions 15—15$^a$ and 15$^b$—15$^c$. The trunnion 15$^a$ of the roller 14 is adapted to enter the opening 20$^a$ of the bearing 19$^a$ and the other trunnion 15 of the said roller is adapted to pass through the way 21 and enter the open slot 20 of the bearing 19, so that the trunnions of the roller 14 are journaled in the opposite bearings 19 and 19$^a$. The trunnion 15$^c$ of the roller 14$^a$ is passed through the opening 20$^c$ in the bearing 19$^c$ and through the bore 18 which registers with the opening 20$^c$, the outer end of the trunnion 15$^c$ projecting into the socket or recess 17 and being squared for the engagement of a suitable key, as designated by the numeral 16. The other trunnion 15$^b$ of the roller 14$^a$ is arranged to be passed through the way 21$^b$ to enter the open slot 20$^b$ of the bearing 19$^b$ so that the trunnions of the roller 14$^a$ are journaled in the opposite bearings 19$^b$ and 19$^c$.

A belt or endless apron 33 is trained over or around the rollers 14 and 14$^a$, the upper run of the belt passing closely below the filling 12 of the egg-holder and being in the plane of the seat 9 and the bottom of the egg-holder. The upper run of the belt forms a support for the eggs and when the egg-holder is seated within the main frame 7, the eggs are raised or elevated slightly out of the openings 13 in order to permit the eggs to rotate freely when the belt is shifted. The openings 13 are elongated transversely of the belt 33 so that the upper run of the belt may be shifted laterally of the said openings in order to rotate the eggs about horizontal axes.

Circular and elongated nuts 24 are journaled in the bores 31 and have the outer flanges 25 engaging in the sockets or seats 32. The bearings 19 and 19$^a$ are provided with threaded extensions 23 projecting therefrom and engaging in the nuts 24 so that when the nuts are rotated, the bearings 19 and 19$^a$ may be adjusted or slid within the recesses 22 and 22$^a$. The flanges 25 of the nuts 24 are provided with outer notches or slots 26 for convenience in rotating the nut by means of a screw-driver or other suitable implement. The flanges 25 engaging in the sockets or seats 32 prevent the nuts from being drawn inwardly, and when the nuts are rotated in the proper direction, the roller 14 may be adjusted to tighten the belt. When the bearings 19 and 19$^a$ are adjusted to tighten the belt, the open slot 20 of the bearing 19 is moved out of registration with the way 21, or sufficiently out of complete registration therewith to prevent the trunnion 15 from being passed upwardly through the way 21. In this manner, when the roller 14 has been adjusted to tighten the belt, the said roller will be locked against removal, and the open slots 20 and 20$^b$ are also inclined away from each other so that when the belt is tightened, the trunnions 15 and 15$^b$ will be locked within the bearings 19 and 19$^b$ to prevent the removal of the rollers and the belt.

Cleats 27 are attached to the inner faces of the opposite sides adjacent the edges of the belt 33 and below the seat 9, and a frame 28 is adapted to seat on the cleats 27 to pass below the upper run of the belt in order to support the upper run of the belt against depression when the eggs are seated thereon. This frame 28 comprises the longitudinal side bars 30 and the cross bars 29 connecting the longitudinal bars 28, the longitudinal bars 30 depending below the bars 29. The endmost cross bars 29 are arranged to seat on the cleats 27 and the longitudinal bars 30 are adapted to engage the ends of the cleats 27 in order to constrain the frame 28 against sliding movement on the cleats 27. When the belt 30 is removed, it will be seen that the frame 28 may be readily raised from the cleats 27 with the belt in order to remove the frame 28 from the frame 7. It will therefore be apparent from the foregoing taken in connection with the drawings, that the belt 33 may be shifted by rotating the roller 14$^a$ in order to shift the upper run of the belt transversely or laterally of the egg-receiving openings 13, this being accomplished by means of the squared end 16 of the trunnion 15$^c$ arranged within the socket or recess 17. It will also be apparent, that by rotating the nuts 24, the rollers 14 may be adjusted in order to tighten or loosen the belt, and that when the belt is tightened, the rollers and the belt will be locked against removal. By loosening the belt so as to bring the open slot 20 into registration with the way 21, the trunnion 15 may be raised out of the bearing 19, in which event, the roller 14 as well as the roller 14ª may be removed together with the belt and the frame 28. When the eggs are inserted in the openings 13, the upper run of the belt or apron may be readily shifted laterally of the openings in order to roll or rotate the eggs about horizontal axes whenever desired or essential. When the egg-holder is seated within the rabbet 8, it will be noted from the foregoing that the eggs in seating on the upper run of the belt will be raised or lifted slightly out of the openings 13 in order that the eggs may be readily rolled or rotated when the belt is shifted.

For convenience in adjusting the roller 14 and for rotating the roller 14ª, there has been provided an implement comprising an elbow 34 having a socket 35 at one end engageable with the squared end 16 of the trunnion 15ᶜ and having a pair of teeth or tines 36 at its other end engageable with the notches or grooves 26 in the flanges 25. This implement may therefore be conveniently employed in connection with the present device for rotating the nuts 24 and for rotating the roller 14ª in order to shift the belt.

In the foregoing manner, the objects aimed at are carried out in an effective and convenient manner, and it will be apparent that by rotating the roller 14ª, the eggs may be rolled very slightly or to any extent desired. The present invention provides a device of this character embodying means for adjusting the belt and for shifting the belt without any protuberances on the main frame so that the main frame has a neat appearance and finish. This device may therefore be used in connection with an incubator of any suitable type and is not cumbersome in its use.

This device may be constructed in various sizes and proportions, and is otherwise susceptible of alterations in its details within the scope of the appended claims without departing from the spirit of the invention.

The egg-holder may be removed from the main frame during the hatch, if desired, in order to permit the eggs and chicks to be positioned upon the upper run of the belt without being restricted in movement by the meshed filling. It is also possible to provide a filling for the frame 10 so that the openings may be of any size desired, according to the sizes of the eggs.

Having described the invention, what is claimed is:—

1. An egg tray embodying a frame having inner recesses in opposite sides and ways extending upwardly from one of each pair of recesses, bearings mounted in the said recesses, one bearing of each pair having an open slot adapted to register with the way and the other bearing having an opening, rollers arranged in the frame and having trunnions-journaled in the slots and openings of the bearings, a belt trained over the rollers, means for adjusting a pair of the bearings, and an egg-holder seatable in the frame over the belt.

2. An egg tray embodying a frame, two pairs of bearings mounted in the opposite sides of the frame, one pair of bearings being slidable and having threaded extensions, one bearing of each pair having an open slot and the other bearing having an opening, the frame having ways with which the said slots are adapted to register, rollers arranged within the frame and having trunnions journaled in the slots and openings of the respective pairs of bearings, a belt trained over the rollers, adjusting nuts journaled in the frame and engaging the said extensions to tighten the belt and bring the slot of the corresponding bearing out of registration with the way, and an egg holder in the frame over the belt.

In testimony that I claim the foregoing as my own, I have hereto affixed my signature in the presence of two witnesses.

HJALMAR A. SWANSON.

Witnesses:
M. C. SWANSON,
B. E. STONE.

Copies of this patent may be obtained for five cents each, by addressing the "Commissioner of Patents, Washington, D. C."